April 26, 1938. F. J. SHOOK 2,115,450

BEAD BUILDING APPARATUS

Filed Aug. 21, 1935

INVENTOR
FLORAIN J. SHOOK
BY Albert L. Ely
ATTORNEY

Patented Apr. 26, 1938

2,115,450

UNITED STATES PATENT OFFICE 2,115,450

BEAD-BUILDING APPARATUS

Florain J. Shook, Akron, Ohio, assignor to National-Standard Company, Niles, Mich., a corporation of Michigan Application August 21, 1935, Serial No. 37,213

5 Claims. (Cl. 154—9)

This invention relates to bead-building apparatus employed in the manufacture of endless, laminated, rubberized bead cores or rings for pneumatic tire casings, and more especially it relates to rotatable forms upon which the bead-building material, in the form of a tape, is wound.

The invention is an improvement upon the bead-building form shown in my copending application for Letters Patent, Serial No. 728,557, now Patent No. 2,080,013 of May 11, 1937 and is especially applicable for use with the machine shown in that application. In its broader aspects, however, the invention is applicable to bead-building forms generally.

The chief objects of the invention are to facilitate the removal of a finished bead core from the form on which it is built; and to provide a collapsible bead-building form wherein the form is expanded to greatest circumference concurrently with the gripping of the leading end of a bead-building tape, at the start of a bead winding operation, and collapsed to reduced circumference concurrently with the release of the leading end of said tape, immediately prior to the ejection of the finished bead core from the form. More specifically the invention aims to provide a work-gripper and form-expander in a single structure operable by a single power-applying member. Other objects will be manifest.

Of the accompanying drawing.

Figure 2:
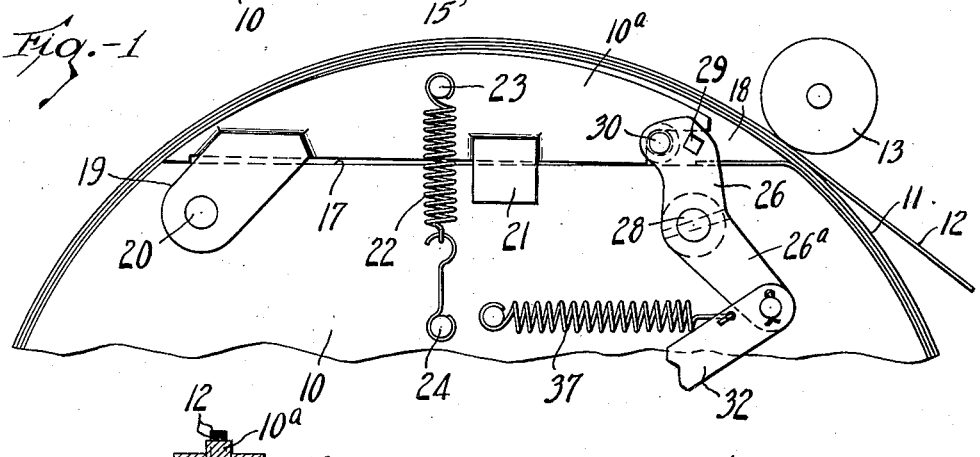
Figure 2 is a similar view showing the improved form in its collapsed position, prior to the ejection of the work therefrom.
Figure 3:
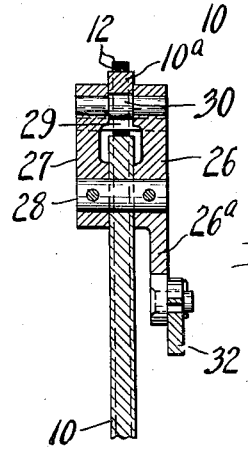
Figure 3 is a section on the line 3—3 of Figure 1.

Referring to the drawing, 10 designates generally a disc-like bead-building form with the usual circular perimeter upon which a bead core is built. The latter, shown complete at 11, Figure 2, is composed of a plurality of convolutions of a rubberized, woven wire tape 12 that is drawn from a suitable source of supply (not shown) and wrapped about the form by reason of the rotation of the latter, the convolutions of tape being compacted on the form by means of a presser roller 13 under which the tape is drawn and which is yieldingly urged toward the periphery of the form. The form 10 is rotated by means of the axial shaft or spindle 14, said form being secured to a hub (not shown) by means of cap screws 15, 15, and said hub being supported upon and keyed to said shaft 14.

Figure 1:
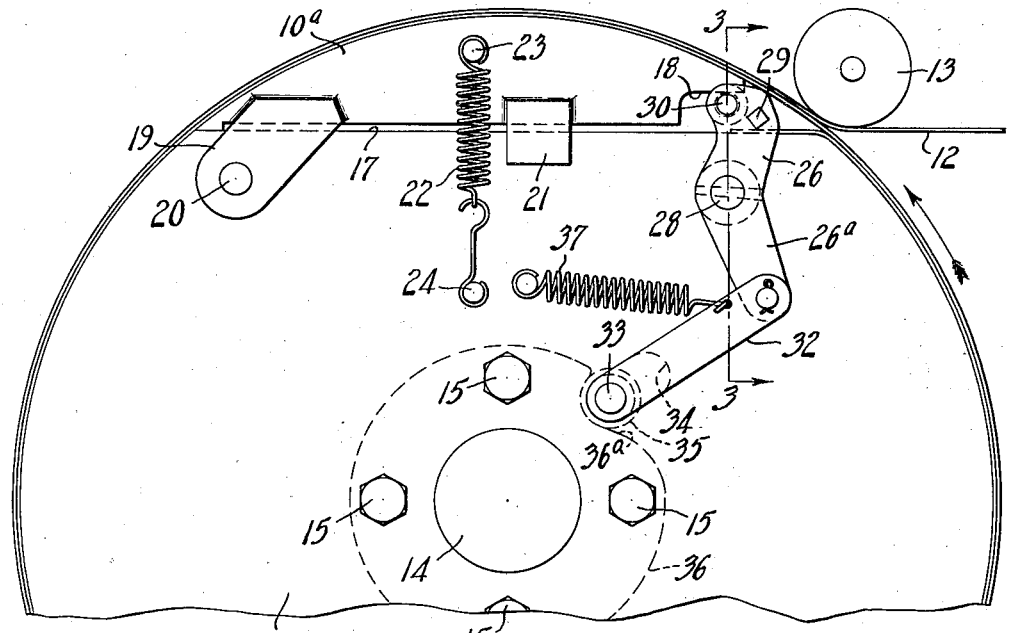
Figure 1 is a fragmentary front elevation of a bead-building form embodying the invention, in its preferred form, in its expanded or operative position, and the work thereon.

The illustrative form 10 as shown consists of two parts, one of which is a chordal segment 10a of relatively small area as compared to the remainder of the form. In the normal operative position of the form shown in Figure 1, the segment 10a is separated from the major section of the form by a chordal slot 17 that is closed at one end, adjacent the perimeter of the form, and at its opposite end opens into a larger non-radial recess or slot 18 in the perimeter of the form. The segment 10a is provided near one of its ends with a pair of parallel spaced-apart ears, such as the ears 19, which ears span the slot 17 near the closed end of the latter and are pivotally connected to the major form-section at 20. A second pair of ears, such as the ears 21, are formed on the segment 10a near the middle thereof and extend across slot 17 to embrace the major form section, thereby imparting lateral stability to the pivotal segment 10a. The arrangement is such that the segment 10a has limited angular movement about the pivot 20, which movement is limited in the expanding of the form by the metal at the closed end of the slot 17, the collapsing movement of the segment being limited to the width of the slot 17 at the open end thereof. The width of slot 17 need not be more than one-eighth inch, this distance permitting sufficient movement of the segment 10a to pull the latter free of the work 11 on its peripheral face, during collapsing of the form. A tension spring 22 connected at its opposite ends to studs 23, 24 projecting from the segment 10a and the major form-section respectively normally urges the said segment toward collapsed position.

Means for moving the segment 10a outwardly, against the tension of spring 22, to bring the form to its normal operative circumference, is provided by effecting a modification of the clamp or gripper that is utilized for clamping the leading end of the tape 12 to the form, within the recess 18, without altering or modifying the work-clamping functions of said gripper. Said clamp or gripper comprises a front gripper arm 26 and parallel rear gripper arm 27, which arms are arranged upon opposite sides of the major form-section, and secured to opposite end portions of a pivot pin 28 that is journaled in the latter. The free ends of arms 26, 27 span the recess 18 in the perimeter of the form, and are connected by and support a renewable hardened metal pin 29 of polygonal cross section, and a cylindrical roller 30 that is journaled at its respective end portions in said arms. Both pin 29 and roller 30 are disposed within the recess 18, said pin being so positioned as to engage the leading end of the tape 12 and to clamp the same against the bottom of the recess 18, when the mechanism is in the operative position shown in Figure 1. The roller 30 is so positioned that it supports the segment 10ª in spaced relation to the major form-section, against the tension of spring 22, in the operative position of the mechanism shown in Figure 1. When the arms 26, 27 are moved angularly to the position shown in Figure 2, the pin 29 is lifted from the leading end of the tape 12, and the roller 30 is so disposed as to permit the spring 22 to collapse the form by moving the segment 10ª about its pivot 20 until its free end rests upon the chordal margin of the major form-section.

The arms 26, 27 are identical except that arm 26 is formed with an oppositely extending lever arm 26ª that has its free end pivotally connected to one end of a link 32, the other end of the latter being pivotally connected to a pin 33 that extends from the rear of the form through a slot 34 therein. The rear end of pin 33 carries a cam roller 35 that rides upon the perimeter of a cam structure 36 that is journaled upon the shaft 14 rearwardly of the form 10. The cam 36 is formed with a single depression 36ª that is abrupt on one side and sloped on the other side, and during the winding of a bead core, while the form 10 is rotating in the direction indicated by the arrow in Figure 1, the cam roller 35 is positioned in said depression 36ª, being urged thereinto by a tension spring 37 that is connected to link 32 and to a fixed point on the form 10, in which position of the parts the clamping pin 29 is in engagement with the leading end of tape 12 and the form is in the expanded position shown in Figure 1. During the intervals that the form 10 is stationary, the cam 36 is moved relatively of the form 10 and hub 14, counterclockwise as viewed in the drawing, to move the link 32 longitudinally against the tension of spring 37 and thereby to move the arms 26, 27 angularly to cause gripper pin 29 to release the end of tape 12 and roller 30 to move to the position shown in Figure 2, thus permitting spring 22 to pull segment 10ª to collapsed position. Means for so moving the cam 36 forms no part of the present invention, but is shown and described in my copending application hereinbefore mentioned.

The mechanism described will concurrently release the leading end of tape 12 and collapse the form to smaller circumference so that the finished bead 11 is easily removed from the form. The invention is simple and effective, and accomplishes the several objects set out in the foregoing statement of objects.

Modifications may be resorted to without departing from the spirit of the invention or the scope of the appended claims.

What is claimed is:

1. A bead-building form comprising a circular, disc-like structure including a fixed major segment and a chordal segment pivotally connected to said major segment at one of its ends and normally spaced from said major segment when the form is expanded to operative circumference, and means at the free end of the chordal segment for rocking it on its pivot to expand and contract the form, said last-mentioned means including means for engaging and releasing the leading end of a strip of bead-building material on the margin of the form.

2. A rotatable bead-building form comprising a circular disc-like structure including a fixed major segment and a chordal segment movable relatively thereto, an arm pivotally mounted upon the fixed segment and angularly movable during intervals that the form is stationary, means on said arm engaging the chordal segment for moving the same relatively of the fixed segment, and means on said arm for engaging the leading end of a strip of bead-building material to hold the same against a margin of the form.

3. A rotatable bead-building form comprising a circular disc-like structure including a fixed major segment and a chordal segment movable relatively thereof, there being a chordal slot between said segments, an arm pivotally mounted upon the fixed segment and angularly movable during intervals that the form is stationary, means on said arm extending laterally, between said segments for moving the chordal segment relatively of the fixed segment, and means on said arm for engaging the leading end of a strip of bead-building material to hold the same against the chordal margin of the fixed segment.

4. A rotatable bead-building form comprising a circular, disc-like structure including a fixed major segment and a chordal segment pivotally connected at one of its ends to the fixed segment, there being a chordal slot between said segments, means normally urging the chordal segment toward the fixed segment, an arm pivotally mounted on the fixed segment and angularly movable during intervals that the form is stationary, means on said arm engaging the chordal segment at the free end thereof for moving said chordal segment pivotally, and means on said arm for engaging the leading end of a strip of bead-building material to hold the same against the chordal margin of the fixed segment.

5. A rotatable bead-building form comprising a circular, disc-like structure including a fixed major segment and a chordal segment hingedly connected at one of its ends to the fixed segment, there being a chordal slot between the segments that is closed at its end adjacent said hinge and at its opposite end merges with a larger, non-radial recess formed in the margin of the form, yielding means normally urging the chordal segment toward the fixed segment, an arm pivotally mounted on the fixed segment and angularly movable when the form is stationary, means on said arm extending into said non-radial recess and engaging a margin of the chordal segment, for moving the latter angularly on its hinge, and means on said arm extending into said non-radial recess adapted to clamp the leading end of a strip of bead-building material to the chordal margin of the fixed segment.

FLORAIN J. SHOOK.